United States Patent
Kwon et al.

(10) Patent No.: US 8,463,002 B2
(45) Date of Patent: Jun. 11, 2013

(54) ROLLED FINGERPRINT ACQUISITION APPARATUS AND METHOD FOR AUTOMATICALLY DETECTING START AND END OF REGISTRATION AND SYNTHESIS

(75) Inventors: Dongjin Kwon, Seoul (KR); Seong Jik Lee, Yongin-si (KR); Bong Seop Song, Seoul (KR); Jae Won Lee, Seongnam-si (KR)

(73) Assignee: Suprema Inc., Seongnam-si (KR)

( * ) Notice: Subject to any disclaimer, the term of this patent is extended or adjusted under 35 U.S.C. 154(b) by 338 days.

(21) Appl. No.: 12/883,382

(22) Filed: Sep. 16, 2010

(65) Prior Publication Data

US 2011/0286640 A1    Nov. 24, 2011

(30) Foreign Application Priority Data

May 18, 2010    (KR) .................. 10-2010-0046574

(51) Int. Cl.
*G06K 9/00*    (2006.01)
(52) U.S. Cl.
USPC ........................................... 382/124
(58) Field of Classification Search
USPC ......... 382/124, 125, 190, 209, 218; 340/5.82, 340/5.83; 713/186; 902/3
See application file for complete search history.

(56) References Cited

U.S. PATENT DOCUMENTS 7,095,880 B2 *    8/2006    Martinez et al. .............. 382/124
8,077,934 B2 *    12/2011   Fenrich et al. ................ 382/124

FOREIGN PATENT DOCUMENTS

| JP | 2010-061576 | 3/2010 |
| KR | 10-2002-0065094 A | 8/2002 |
| KR | 10-2005-0010102 A | 1/2005 |
| KR | 10-2007-0078036 A | 7/2007 |

\* cited by examiner

*Primary Examiner* — Daniel Mariam
(74) *Attorney, Agent, or Firm* — NSIP Law

(57) ABSTRACT

Provided are a rolled fingerprint acquisition apparatus and method for automatically detecting the start and end of registration and synthesis to acquire an accurate fingerprint. The rolled fingerprint acquisition apparatus compares at least one of fingerprint characteristic information and the amount of variation between the fingerprint characteristic information to reference fingerprint characteristic information to determine whether to start or end registration and synthesis, wherein the fingerprint characteristic information is information about fingerprints included in rolled fingerprint frames that are sequentially acquired, and registers and synthesizes the rolled fingerprint frames according to the result of the determination.

19 Claims, 14 Drawing Sheets

ROLLED FINGERPRINT ACQUISITION APPARATUS AND METHOD FOR AUTOMATICALLY DETECTING START AND END OF REGISTRATION AND SYNTHESIS

CROSS-REFERENCE TO RELATED APPLICATION

This application claims the benefit under 35 U.S.C. §119 (a) of a Korean Patent Application No. 10-2010-0046574, filed on May 18, 2010, the entire disclosure of which is incorporated herein by reference for all purposes.

BACKGROUND

1. Field

The following description relates to a technique of acquiring a fingerprint by registering and synthesizing rolled fingerprint frames.

2. Description of the Related Art

Recently, with an increase of information exchange through the Internet, demands for accuracy of personal authentication are increasing more and more. In order to meet the demands, authentication through biometrics is gradually extending.

In general, biometrics authentication includes certification through fingerprints, voices, images, electronic signatures, etc. Specifically, fingerprint certification occupies about 70% of a biometrics-related market since it requires contact with only a user's finger to ensure excellent convenience and allows a simple structure.

A fingerprint recognition system may be applied to small-sized digital devices, such as a laptop computer, a mobile phone, a PDA, etc., as well as a network security system.

In order to accurately acquire a fingerprint, a rolled fingerprint acquisition method has been widely used. When a user's finger contacts and rolls on a fingerprint acquisition apparatus, a conventional rolled fingerprint acquisition method acquires rolled fingerprint frames at regular time intervals, cuts out portions where the acquired rolled fingerprint frames overlap each other and then synthesizes the resultant fingerprint frames to acquire a final fingerprint.

However, the conventional rolled fingerprint acquisition method has a problem that while a fingerprint is acquired, important fingerprint-related information may be deleted. Therefore, studies into a method capable of accurately acquiring a fingerprint while avoiding deletion of important fingerprint-related information are being actively conducted.

SUMMARY

The following description relates to a rolled fingerprint acquisition apparatus and method capable of automatically detecting the start and end of registration and synthesis using fingerprint characteristic information values of fingerprints included in rolled fingerprint frames, thereby conveniently acquiring a fingerprint.

The following description also relates to a rolled fingerprint acquisition apparatus and method capable of automatically detecting the start and end of registration and synthesis and registering and synthesizing rolled fingerprint frames using reference lines set for registration and synthesis, thereby acquiring an accurate fingerprint.

In one general aspect, there is provided a rolled fingerprint acquisition method which automatically detects a start and end of registration and synthesis, including: extracting fingerprint characteristic information of fingerprints included in rolled fingerprint frames that are sequentially acquired; comparing at least one of the fingerprint characteristic information and the amount of variation between the fingerprint characteristic information to reference fingerprint characteristic information to determine whether to start or end registration and synthesis; and registering and synthesizing the rolled fingerprint frames according to the result of the determination.

The rolled fingerprint acquisition method may further include selecting target frames to be subject to registration and synthesis from among the rolled fingerprint frames based on central location values of fingerprints included in rolled fingerprint frames acquired after registration and synthesis have been started.

The selecting of the target frames to be subject to the registration and synthesis may include: extracting central location values of fingerprints included in rolled fingerprint frames acquired after registration and synthesis have been started; selecting a first target frame to be subject to registration and synthesis from among the acquired rolled fingerprint frames; selecting a rolled fingerprint frame whose central location is farther than a threshold value from a central location of the first target frame to be subject to registration and synthesis as a second target frame to be subject to registration and synthesis; and selecting a rolled fingerprint frame whose central location is farther than the threshold value from the central location of the second target frame to be subject to registration and synthesis as a third target frame to be subject to registration and synthesis.

The registering and synthesizing of the rolled fingerprint frames may include: setting a first reference line for dividing a region where a first foreground corresponding to a fingerprint of a first rolled fingerprint frame that is a rolled fingerprint frame acquired after it is determined that registration and synthesis should be started overlaps a foreground corresponding to a fingerprint of a second rolled fingerprint frame; setting at least two of points that are included in the second foreground and are on the first reference line as control points; calculating displacements from the control points to points that are on the first rolled fingerprint frame and match the control points; registering the second rolled fingerprint frame with the first rolled fingerprint frame based on the displacements to create a first registered frame; moving the control points by the displacements and connecting the moved control points to set a second reference line; and synthesizing the first registered frame with the first rolled fingerprint frame using the second reference line.

The synthesizing of the first registered frame with the first rolled fingerprint frame may include assigning a weight to a pixel intensity value of a foreground including a fingerprint of the first rolled fingerprint frame in a portion that include a central location of the first rolled fingerprint frame with respect to the second reference line, and assigning a weight to a pixel intensity value of a foreground including a fingerprint of the first registered frame of a portion that include a central location of the first registered frame with respect to the second reference line.

The rolled fingerprint acquisition method may further include outputting a start notification signal or an end notification signal through an output unit, according to the result of the determination on whether to start or end registration and synthesis.

In another general aspect, there is provided a rolled fingerprint acquisition apparatus including: a start/end determiner to compare at least one of the fingerprint characteristic information and the amount of variation between the fingerprint characteristic information to reference fingerprint characteristic information and determine whether to start or end registration and synthesis, wherein the fingerprint characteristic information is information about fingerprints included in rolled fingerprint frames that are sequentially acquired; and a registration/synthesis unit to register and synthesize the rolled fingerprint frames according to the result of the determination.

The rolled fingerprint acquisition apparatus may further include a selector to select a target frame to be subject to registration and synthesis based on central location values of fingerprints included in rolled fingerprint frames acquired after registration and synthesis have been started.

The selector may extract central location values of fingerprints included in rolled fingerprint frames acquired after registration and synthesis have been started, select a first target frame to be subject to registration and synthesis from among the acquired rolled fingerprint frames, select a rolled fingerprint frame whose central location is farther than a threshold value from the central location of the first target frame as a second target frame to be subject to registration and synthesis, and select a rolled fingerprint frame whose central location is farther than the threshold value from the central location of the second target frame as a third target frame to be subject to registration and synthesis.

The registration/synthesis unit may set a first reference line for dividing a region where a first foreground corresponding to a fingerprint of a first rolled fingerprint frame acquired after it is determined that registration and synthesis should be started overlaps a second foreground corresponding to a fingerprint of a second rolled fingerprint frame, set at least two of points that are included in the second foreground and are on the first reference line as control points, calculate displacements from the control points to points that are on the first rolled fingerprint frame and match the control points, register the second rolled fingerprint frame with the first rolled fingerprint frame based on the displacements to create a first registered frame, moves the control points by the displacements, then connect the moved control points to set a second reference line, and synthesize the first registered frame with the first rolled fingerprint frame using the second reference line.

The registration/synthesis unit may assign a weight to a pixel intensity value of a portion including a central location of the first rolled fingerprint frame with respect to the second reference line and assign a weight to a pixel intensity value of a portion including a central location of the first registered frame with respect to the second reference line.

Other features and aspects will be apparent from the following detailed description, the drawings, and the claims.

Figure 1:
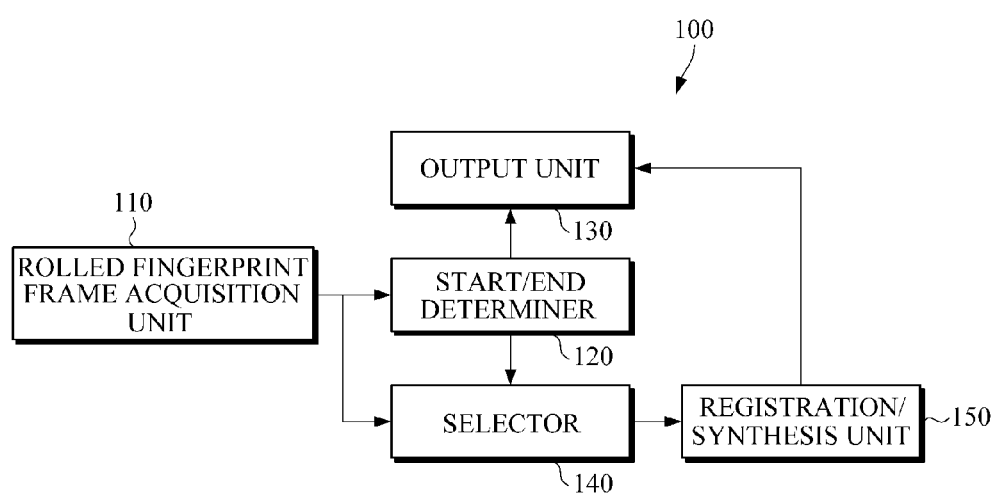
FIG. 1 is a diagram illustrating an example of a rolled fingerprint acquisition apparatus for automatically detecting the start and end of registration and synthesis.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating an example of a rolled fingerprint acquisition apparatus 100 for automatically detecting the start and end of registration and synthesis.

Referring to FIG. 1, the rolled fingerprint acquisition apparatus 100 includes a rolled fingerprint frame acquisition unit 110, a start/end determiner 120, an output unit 130, a selector 140 and a registration/synthesis unit 150.

The rolled fingerprint frame acquisition unit 110 may include an optical-type, ultrasonic-type, or semiconductor-type sensor. That is, the rolled fingerprint frame acquisition unit 110 may acquire a user's fingerprint image through the optical-type, ultrasonic-type or semiconductor-type sensor. The rolled fingerprint frame acquisition unit 110 acquires rolled fingerprint frames at regular time intervals when the user's finger contacts and rolls thereon. For example, the rolled fingerprint frame acquisition unit 110 may acquire rolled fingerprint frames every 0.5 seconds. In this case, if the contact and rolling of the user's finger is terminated when 2 seconds elapse, a total of 4 rolled fingerprint frames will be acquired.

The start/end determiner 120 extracts fingerprint characteristic information of fingerprints included in rolled fingerprint frames that are sequentially acquired by the rolled fingerprint frame acquisition unit 110. The start/end determiner 120 may compare at least one of the fingerprint characteristic information and the amount of variation between the fingerprint characteristic information to reference fingerprint characteristic information to determine whether to start or end registration and synthesis, wherein the fingerprint characteristic information is information about fingerprints included in rolled fingerprint frames that are sequentially acquired by the rolled fingerprint frame acquisition unit 110. The fingerprint characteristic information may be the size values of the fingerprints, the intensity values of pixels corresponding to the fingerprints, the numbers of regions surrounded by closed curves included in the fingerprints, the central location values of the fingerprints, etc. The reference fingerprint characteristic information may be the size of a reference fingerprint, the amount of variation in reference size, the intensity value of a reference pixel, the amount of variation in intensity value of a reference pixel, the number of reference regions, etc. Here, the reference fingerprint, reference size, reference regions, etc. may be set by a user or manufacturer.

For example, when the fingerprint characteristic information is the amount of variation in size of the fingerprints, the start/end determiner 120 may compare the amount of variation in size of the fingerprints with a reference size variation value to determine whether to start or end registration and synthesis according to the result of the comparison. For this, the start/end determiner 120 extracts the size values of the fingerprints included in the acquired rolled fingerprint frames and determines whether the amount of variation between the size values of the extracted fingerprints is smaller than the reference size variation value. If the amount of variation between the size values of the extracted fingerprints is smaller than the reference size variation value, the start/end determiner 120 determines that registration and synthesis should be started. After registration and synthesis are started, when the start/end determiner 120 determines that the amount of variation between the size values of the extracted fingerprints is smaller than the reference size variation value, the start/end determiner 120 may determine that the registration and synthesis should be ended. Since the amount of variation in size of fingerprints between an initially acquired rolled fingerprint frame and a finally acquired rolled fingerprint frame is generally small, the start/end determiner 120 may determine whether to start or end registration and synthesis based on the amount of variation in size of fingerprints between the initially acquired rolled fingerprint frame and the finally acquired rolled fingerprint frame. Here, the amount of variation in size may be the amount of variation in size between fingerprints included in at least two rolled fingerprint frames.

As another example, when the fingerprint characteristic information is the size values of the fingerprints, the start/end determiner 120 may determine whether to start or end registration and synthesis by comparing the size value of each extracted fingerprint with a reference fingerprint size value. For this, the start/end determiner 120 extracts the size values of fingerprints included in acquired rolled fingerprint frames and determines whether or not the size value of a fingerprint included in at least one rolled fingerprint frame is greater than a reference fingerprint size value. If the size value of a fingerprint included in at least one rolled fingerprint frame is greater than the reference fingerprint size value, the start/end determiner 120 may determine that registration and synthesis should be started. After the registration and synthesis are started, when the start/end determiner 120 determines that the size value of a fingerprint is smaller than the reference fingerprint size value, the start/end determiner 120 may determine that the registration and synthesis should be ended.

As another example, when the fingerprint characteristic information is the size values of the fingerprints and the amount of variation in size between the fingerprints, the start/end determiner 120 extracts the size values of fingerprints included in acquired rolled fingerprint frames. Then, the start/end determiner 120 determines whether the amount of variation between the size values of the extracted fingerprints is smaller than the reference size variation value and whether the size value of a fingerprint included in at least one of the acquired rolled fingerprint frames is greater than the reference fingerprint size value. If the amount of variation between the size values of the extracted fingerprints is smaller than the reference size variation value and the size value of a fingerprint included in at least one of the acquired rolled fingerprint frames is greater than the reference fingerprint size value, the start/end determiner 120 determines that registration and synthesis should be started. Thereafter, when the size value of a fingerprint included in at least one rolled fingerprint frame extracted after the registration and synthesis are started is smaller than the reference' fingerprint size value, the start/end determiner 120 may determine that the registration and synthesis should be ended. That is, the amount of variation in size of fingerprints may be used only for determination on whether or not to start registration and synthesis.

As another example, when the fingerprint characteristic information is the size values of the fingerprints and the amount of variation in size between the fingerprints, the start/end determiner 120 extracts the size values of the fingerprints included in the acquired rolled fingerprint frames. Then, the start/end determiner 120 determines whether the amount of variation between the size values of the extracted fingerprints is smaller than the reference size variation value and whether the size value of a fingerprint included in at least one of the acquired rolled fingerprint frames is greater than the reference fingerprint size value. If the amount of variation between the size values of the extracted fingerprints is smaller than the reference size variation value and the size value of a fingerprint included in at least one of the acquired rolled fingerprint frames is greater than the reference fingerprint size value, the start/end determiner 120 determines that registration and synthesis should be started. After registration and synthesis are started, when the start/end determiner 120 determines that the amount of variation between the size values of extracted fingerprints is smaller than the reference size variation value and the size value of a fingerprint included in at least one of rolled fingerprint frames is smaller than the reference fingerprint size value, the start/end determiner 120 may determine that the registration and synthesis should be ended.

As another example, when the fingerprint characteristic information is the amount of variation between the intensity values of pixels corresponding to the fingerprints, the start/end determiner 120 may determine whether to start or end registration and synthesis by comparing the amount of variation between the intensity values of pixels with a reference pixel intensity variation value. For this, the start/end determiner 120 extracts the intensity values of pixels corresponding to fingerprints included in the acquired rolled fingerprint frames or the intensity is values of blocks consisting of pixels corresponding to fingerprints included in the acquired rolled fingerprint frames. Hereinafter, descriptions will be provided under an assumption that images are represented by 8-bit gray levels.

The intensity value of each pixel belonging to an image may be represented by a value of 0 to 255, wherein a value of 0 corresponds to a darkest black color and a value of 255 corresponds to a brightest white color. Accordingly, the intensity values of pixels corresponding to a fingerprint will be near 0 and the intensity values of pixels corresponding to the remaining portion will be near 255. It is also possible to set the intensity value of a pixel having a darkest black color to 255 and the intensity value of a pixel having a brightest white color to 0. Also, it is possible that images are represented by 12-bit or 16-bit gray levels. The intensity values of pixels may be a mean value or a minimum value of extracted pixel intensity values or a difference between the maximum and minimum values of extracted pixel intensity values.

When the amount of variation between pixel intensity values is smaller than a reference pixel intensity variation value, the start/end determiner 120 may determine that registration and synthesis should be started. After registration and synthesis are started, when the amount of variation between pixel intensity values is smaller than the reference pixel intensity variation value, the start/end determiner 120 determines that the registration and synthesis should be ended. Since the amount of variation in pixel intensity values between an initially acquired rolled fingerprint frame and a finally acquired rolled fingerprint frame is generally small, the start/end determiner 120 may determine whether to start or end registration and synthesis, based on the amount of variation in pixel intensity values between the initially acquired rolled fingerprint frame and the finally acquired rolled fingerprint frame.

For example, it is assumed that a mean value of pixel intensity values corresponding to a fingerprint included in a first rolled fingerprint frame is 30, a mean value of pixel intensity values corresponding to a fingerprint included in a second rolled fingerprint frame is 25, a mean value of pixel intensity values corresponding to a fingerprint included in a third rolled fingerprint frame is 10, a mean value of pixel intensity values corresponding to a fingerprint included in a fourth rolled fingerprint frame is 15, and a reference pixel intensity variation value is 10. Here, the first and second rolled fingerprint frames are frames acquired before registration and synthesis are started and the third and fourth rolled fingerprint frames are frames acquired after registration and synthesis are started. In this case, since the amount of variation between the pixel intensity values of the first and second rolled fingerprint frames is "5," which is smaller than the reference pixel intensity variation value "10," the start/end determiner 120 may determine that registration and synthesis should be started. After registration and synthesis are started, since the amount of variation between the pixel intensity values of the third and fourth rolled fingerprint frames is "5" which is smaller than the reference pixel intensity variation value "10," the start/end determiner 120 may determine that the registration and synthesis should be ended.

The current example corresponds to the case where four rolled fingerprint frames are provided, however, the start/end determiner 120 may determine whether to start or end registration and synthesis with respect to a plurality of rolled fingerprint frames. For example, the start/end determiner 120 determines whether to start registration and synthesis based on the amount of variation between the pixel intensity values of four rolled fingerprint frames and whether to end registration and synthesis based on the amount of variation between the pixel intensity values of four rolled fingerprint frames acquired after the registration and synthesis have been started.

As another example, when the fingerprint characteristic information is pixel intensity values corresponding to the fingerprints, the start/end determiner 120 may compare the pixel intensity value corresponding to each fingerprint with a reference pixel intensity value and determine whether to start or end registration and synthesis according to the result of the comparison. The start/end determiner 120 extracts the intensity values of pixels corresponding to fingerprints included in acquired rolled fingerprint frames or the intensity values of blocks consisting of pixels corresponding to fingerprints included in the acquired rolled fingerprint frames. When the intensity value of pixels corresponding to each fingerprint is smaller than the reference pixel intensity value, the start/end determiner 120 may determine that registration and synthesis should be started. After the registration and synthesis are started, when determining that a pixel intensity value of a fingerprint is greater than the reference pixel intensity value, the start/end determiner 120 determines that the registration and synthesis should be ended. A pixel intensity value that is smaller than the reference pixel intensity value means that the intensity of the corresponding fingerprint has a dark color below a predetermined criterion.

As another example, when the fingerprint characteristic information is the numbers of regions surrounded by closed curves included in the fingerprints of the acquired rolled fingerprint frames, the start/end determiner 120 may compare the numbers of regions surrounded by closed curves with a reference region number and determine whether to start or end registration and synthesis according to the result of the comparison. For this, the start/end determiner 120 extracts the numbers of regions surrounded by closed curves included in the fingerprints of acquired rolled fingerprint frames. When the number of regions extracted from a fingerprint is greater than the reference region number, the start/end determiner 120 may determine that registration and synthesis should be started. After the registration and synthesis are started, when the start/end determiner 120 determines that the number of regions extracted from a fingerprint is smaller than the reference region number, the start/end determiner 120 may determine that the registration and synthesis should be ended.

As another example, when the fingerprint characteristic information is the central location values of the fingerprints included in the rolled fingerprint frames, the start/end determiner 120 extracts the central location values of the fingerprints included in the acquired rolled fingerprint frames. The central location values of the fingerprints may be represented by coordinate values. The start/end determiner 120 extracts movement directions of the central locations of the fingerprints by comparing the central location values of the fingerprints to each other. When a movement direction of central locations is inverted, the start/end determiner 120 may determine that registration and synthesis should be started. For example, the start/end determiner 120 may determine that a central location moves from the left to right based on the central location values of first and second rolled fingerprint frames. Thereafter, when the start/end determiner 120 determines that a central location moves from the right to left based on the central location values of third and fourth rolled fingerprint frames, the start/end determiner 120 may determine that registration and synthesis should be started. The above-described example corresponds to the case where a user contacts a rolled fingerprint acquisition unit with his or her finger and rolls to the right and then to the left. As such, when the finger's rolling direction changes, the start/end determiner 120 may determine that registration and synthesis should be started.

As another example, the start/end determiner 120 may determine that registration and synthesis should be started or ended based on a combination of two or more conditions, such as the size values of fingerprints, the intensity values of pixels corresponding to fingerprints, the number of regions surrounded by closed curves included in fingerprints, and the central location values of fingerprints. In the case where registration and synthesis are determined to be started or ended based on the size values and pixel intensity values of fingerprints, the start/end determiner 120 may determine whether to start or end registration and synthesis, depending on whether a size value of an extracted fingerprint is greater than a reference size value and whether a pixel intensity value of the fingerprint is smaller than a reference pixel intensity value. When the size value of a fingerprint included in at least one rolled fingerprint frame is greater than the reference fingerprint value and the pixel intensity value of the fingerprint is smaller than the reference pixel intensity value, the start/end determiner 120 may determine that registration and synthesis should be started. In contrast, if the size value of a fingerprint included in at least one rolled fingerprint frame is smaller than the reference fingerprint size value or the pixel intensity value of the fingerprint is greater than the reference pixel intensity value, the start/end determiner 120 determines that registration and synthesis should be ended.

As another example, the start/end determiner 120 determines whether to start registration and synthesis based on the movement direction of the central locations of fingerprints included in rolled fingerprint frames, and whether to end registration and synthesis based on the size values of the fingerprints. Details for this will be described later with reference to FIG. 6.

As such, the start/end determiner 120 may determine whether to start or end registration and synthesis, based on a combination of two or more conditions, such as the size values of fingerprints, the intensity values of pixels corresponding to fingerprints, the number of regions surrounded by closed curves included in fingerprints, and the central location values of fingerprints. That is, by determining whether to start or end registration/synthesis using two or more conditions, the start/end determiner 120 may improve reliability of determination.

The start/end determiner 120 or the registration/synthesis unit 150 may output a notification signal through the output unit 130. Here, the notification signal is used to allow a user to recognize a fingerprint acquisition process. For example, the notification signal may include a start notification signal, an end notification signal, a quality notification signal, etc. For example, the start/end determiner 120 may output a start or end notification signal through the output unit 130 according to the result of determination on whether to start or end registration/synthesis. Here, the start or end notification signal is used to inform a user that registration and synthesis of a fingerprint have been started or ended. The registration/synthesis unit 150 may output a quality notification signal through the output unit 130 depending on whether registration and synthesis have been successfully performed. The quality notification signal is used to inform a user that registration and synthesis of a fingerprint have been successfully performed.

The output unit 130 may be used to generate a visual, auditory or tactile output. The output unit 130 may be a display, a sound output unit, a vibration unit, LED, etc.

The display may visually display (output) a start/end/quality notification signal received from the start/end determiner 120. For example, the display may be at least one among a liquid crystal display (LCD), a thin film transistor-liquid crystal display (TFT LCD), an organic light-emitting diode (OLED), a flexible display and a 3-dimensional (3D) display.

The sound output unit may aurally output a start/end/quality notification signal received from the start/end determiner 120. The sound output unit may be a speaker, an earphone, a buzzer, etc.

The vibration unit may tactually output a start/end/quality notification signal received from the start/end determiner 120. For example, the vibration unit may output a start/end quality notification signal as vibrations. The vibration unit may include a motor, etc. that can make vibrations.

The LED is a lighting that can emit light. The LED may output various colors including green, red, etc.

For example, when a start/end/quality notification signal is received, the output unit 130 outputs the start/end/quality notification signal through at least one of the display, the sound output unit, the vibration unit and the LED. As an example, the output unit 130 may output a beep sound or voice that can inform that registration and synthesis have been started or ended, through the sound output unit. Or, the output unit 130 may generate vibrations that can inform that registration and synthesis have been started or ended, through the vibration unit. The output unit 130 may inform a user that registration and synthesis have been started or ended or inform a user of quality of an acquired fingerprint by turning on/off the LED.

Since the output unit 130 outputs a start/end/quality notification signal through at least one of the display, the sound output unit, the vibration unit and the LED, a user may easily recognize the start/end of registration and synthesis or quality of an acquired fingerprint.

The selector 140 may select a target frame to be subject to registration and synthesis, from among rolled fingerprint frames acquired after registration and synthesis have been started. The target frame to be subject to registration and synthesis, acquired just after registration and synthesis are started, is a rolled fingerprint frame to be used for registration and synthesis. For example, the selector 140 extracts the central location values of fingerprints included in rolled fingerprint frames acquired after registration and synthesis are started, and then selects a first target frame to be subject to registration and synthesis, from among the acquired rolled fingerprint frames, based on the extracted central location values. For example, the selector 140 selects a first rolled fingerprint frame acquired after registration and synthesis are started, as a first target frame to be subject to registration and synthesis, or arbitrarily selects any one among rolled fingerprint frames acquired after registration and synthesis are started, as a first target frame to be subject to registration and synthesis. Then, the selector 140 selects a rolled fingerprint frame whose central location is distant above a threshold value from the central location of the first target frame to be subject to registration and synthesis, as a second target frame to be subject to registration and synthesis. Next, the selector 140 selects a rolled fingerprint frame whose central location is distant above the threshold value from the second target frame, as a third target frame to be subject to registration and synthesis. By repeating the above-described process, the selector 140 may select target frames to be subject to registration and synthesis. The selector 140 repeats the above-described process until the start/end determiner 120 determines that registration and synthesis should be ended. Details for this will be described later with reference to FIG. 5.

The selector 140 may calculate the central locations of fingerprints included in rolled fingerprint frames acquired by the rolled fingerprint frame acquisition unit 110, using the following method.

For example, the selector 140 extracts a foreground including a fingerprint and a background including no fingerprint, from a rolled fingerprint frame. The selector 140 smoothes the rolled fingerprint frame and then extracts a portion of the rolled fingerprint frame whose pixel intensity values are smaller than a pixel intensity variation threshold value, as a foreground. That is, the selector 140 may extract a black portion of the rolled fingerprint frame as a foreground. Meanwhile, the selector 140 may extract a portion of the rolled fingerprint frame whose pixel intensity values are greater than the pixel intensity variation threshold value, as a background. That is, the selector 140 may extract a white portion of the rolled fingerprint frame as a background. Alternatively, the selector 140 divides the rolled fingerprint frame into a plurality of blocks, calculates intensity variances of the blocks and then extracts a foreground and a background using the intensity variances. For example, the selector 140 extracts a block whose intensity variance is smaller than an intensity variance threshold value, as a foreground. Meanwhile, the selector 140 extracts a block whose intensity variance is greater than the intensity variance threshold value, as a background. However, the selector 140 may extract a is foreground and a background using other methods than the above-described method.

Successively, the selector 140 calculates a center of mass for the extracted foreground and determines the center of mass as a central location. Here, the center of mass may be calculated by Equation 1 below.

$$cx = \frac{\sum_{px,py} w(px, py) \cdot px}{\sum_{px,py} w(px, py)},$$

$$cy = \frac{\sum_{px,py} w(px, py) \cdot py}{\sum_{px,py} w(px, py)},$$

(1)

where cx is an x coordinate of the center of mass, cy is a y coordinate of the center of mass, px is an x coordinate of each pixel of the rolled fingerprint frame, py is a y coordinate of the pixel of the rolled fingerprint frame and w(px, py) is a weight.

If (px, py) is a point on the foreground, w(px, py)=1, and if (px, py) is a point on the background, w(px, py)=0.

As another example, the selector 140 calculates the center of mass using Equations 1, 2 and 3 and determines the calculated center of mass as a central location. In this case, the selector 140 need extract neither foreground nor background from the rolled fingerprint frame.

$$w(px,py)=255-I(px,py) \quad (2)$$

$$w(px,py)=1/(I(px,py)+1) \quad (3)$$

Instead of Equations 2 and 3, other equations to assign higher weights to pixels having darker colors may be used.

As another example, the selector 140 extracts the outline of a fingerprint included in a rolled fingerprint frame and determines, as a central location, a point at which the middle line of the horizontal width of the outline crosses the middle line of the vertical width of the outline.

However, the selector 140 may obtain the central location using other methods than the above-described examples.

The registration/synthesis unit 150 may register all acquired rolled fingerprint frames or register target frames to be subject to registration and synthesis.

The registration/synthesis unit 150 sets a first reference line for dividing a region where a first foreground including a fingerprint of a first rolled fingerprint frame overlaps a second foreground including a fingerprint of a second rolled fingerprint frame. The registration/synthesis unit 150 sets at least two points that are included in the second foreground and are on the first reference line as control points. Then, the registration/synthesis unit 150 calculates displacements from the control points to points that are on the foreground of the first rolled fingerprint frame and match the control points. Next, the registration/synthesis unit 150 registers the second rolled fingerprint frame with the first rolled fingerprint frame based on the displacements to create a first registered frame. Successively, the registration/synthesis unit 150 moves the control points by the displacements and connects the moved control points to each other to set a second reference line.

As an example of a method of setting the first reference line, the registration/synthesis unit 150 may connect points at which the outline of the first foreground crosses the outline of the second foreground to set a first reference line.

As another example, the registration/synthesis unit 150 may perform morphological erosion on the first and second foregrounds to extract points at which the outline of the first foreground meets the outline of the second foreground and then connect the points to each other to set a first reference line.

As another example, the registration/synthesis unit 150 may calculate a central location value of a region where the first foreground overlaps the second foreground, and set a line perpendicular to a line connecting a central location of the first foreground to a central location of the second foreground as a first reference line.

As another example, the registration/synthesis unit 150 may apply an ellipse fitting algorithm to a region where the first foreground overlaps the second foreground to extract an ellipse and set a line corresponding to the major axis of the ellipse as a first reference line.

Details for the method of setting the first reference line will be described later with reference to FIGS. 8A through 8E.

The registration/synthesis unit 150 may register and synthesize the target frames to be subject to registration/synthesis, selected by the selector 140, using the above-described method.

As an example of a method of registering target frames, the registration/synthesis unit 150 extracts a foreground of the first rolled fingerprint frame and a foreground of the second rolled fingerprint frame. Then, the registration/synthesis unit 150 correlates the first rolled fingerprint frame with the second rolled fingerprint frame and then extracts a region where the first foreground overlaps the second foreground. The registration/synthesis unit 150 sets at least two points that are included in the second foreground and are on the first reference line as control points. Then, the registration/synthesis unit 150 may calculate matching scores in which degrees of sameness or similarity between each control point and individual points on the reference frame are scored, and decide on a point having a greatest matching score as a point matching the control point. The matching scores may be calculated by comparing the intensity value of the control point with the intensity value of each point of the reference frame. Alternatively, the matching scores may be calculated by comparing the intensity value of a block including the control point with the intensity value of each block of the reference frame.

As another example, the registration/synthesis unit 150 may calculate displacements based on displacements with respect to another control point. For example, the case where a displacement calculated based on a first control point is "2," two points having a greatest matching score with respect to a second control point are found and displacements of the two points are respectively "1" and "10" will be explained. The registration/synthesis unit 150 may select a displacement having the smaller difference from the displacements calculated with respect to the first control point, from among the displacements 1 and 10 calculated with respect to the second control point. Therefore, the registration/synthesis unit 150 may select "1" as the second control point.

The registration/synthesis unit 150 registers the second rolled fingerprint frame with the first rolled fingerprint frame based on the calculated displacements. For example, the registration/synthesis unit 150 may register the second rolled fingerprint frame with the first rolled fingerprint frame by moving all pixels of the second rolled fingerprint frame based on the calculated displacements. At this time, the registration/synthesis unit 150 may determine distance for moving the pixels of the second rolled fingerprint frame by interpolating displacements of pixels adjacent to the pixels.

Then, the registration/synthesis unit 150 may synthesize the first registered frame with the first rolled fingerprint frame using the second reference line.

Next, the registration/synthesis unit 150 synthesizes a portion in the left with respect to the second reference line and a portion in the right with respect to the second reference line, respectively, using different synthesis methods.

For example, the registration/synthesis unit 150 may assign a weight to a pixel intensity value of a foreground including a fingerprint of the first rolled fingerprint frame in a portion that is include a central location of the first rolled fingerprint frame with respect to the second reference line, and assign a weight to a pixel intensity value of a foreground including a fingerprint of the first registered frame of a portion that include a central location of the first registered frame with respect to the second reference line. The registration/synthesis unit 150 may synthesize the first rolled frame and the first registered frame based on the assigned weight.

As another example, the registration/synthesis unit 150 may assign a higher weight to the pixel intensity value of the first rolled fingerprint frame than to the pixel intensity value of the first registered frame, in a portion including a central location of the first rolled fingerprint frame with respect to the second reference line, and assign a higher weight to the pixel intensity value of the first registered frame than to the pixel intensity value of the first rolled fingerprint frame, in a portion including a central location of the first registered frame with respect to the second reference line.

For example, the registration/synthesis unit 150 may assign the weight to the pixel intensity value of the portion including the central location of the first rolled fingerprint frame with respect to the second reference line, using Equation 4. Also, the registration/synthesis unit 150 may assign the weight to the pixel intensity value of the portion including the central location of the first registered frame with respect to the second reference, using Equation 5.

$$U1(p)=a*S(p)+(1-a)*I(p) \quad (4)$$

where p is the location of each pixel, a is a value that is between "0" and "1" and defined to have a smaller value asp approaches the control point, S(p) is a pixel intensity value corresponding to the p pixel in the first rolled fingerprint frame, I(p) is a pixel intensity value corresponding to the p pixel in the first registered frame, and $U1(p)$ is a pixel intensity value corresponding to the p pixel in a frame obtained by synthesizing the first rolled fingerprint frame with the first registered frame.

$$U2(p)=(1b)*S(p)+b*I(p) \quad (5)$$

where p is the location of each pixel, b is a value that is between "0" and "1" and defined to have a smaller value asp approaches the control point, S(p) is a pixel intensity value corresponding to the p pixel in the first rolled fingerprint frame, I(p) is a pixel intensity value corresponding to the p pixel in the first registered frame, and $U2(p)$ is a pixel intensity value corresponding to the p pixel in a frame obtained by synthesizing the first rolled fingerprint frame with the first registered frame.

As another example, the registration/synthesis unit 150 may synthesize blocks located on the left with respect to the second reference line and blocks located on the right with respect to the second reference line, respectively, using different methods.

A method of synthesizing a portion on the left with respect to the second reference line and a portion on the right with respect to the second reference line, respectively, using Equations 4 and 5 is described, however, Equations 4 and 5 are only an example. That is, instead of Equations 4 and 5, other equations to assign different weights to a portion located on the left with respect to the second reference line and a portion located on the right with respect to the second reference line may be used.

The registration/synthesis unit 150 may output a quality notification signal through the output unit 130 according to whether or not registration and synthesis have been successfully performed.

The rolled fingerprint acquisition apparatus which can automatically detect whether to start or end registration and synthesis may register and synthesize only rolled fingerprint frames suitable for synthesis among acquired rolled fingerprint frames by determining whether to start or end registration and synthesis.

Also, the rolled fingerprint acquisition apparatus which can automatically detect whether to start or end registration and synthesis informs a user that registration and synthesis have been started or ended through an output unit, so that the user can easily recognize the start/end of registration and synthesis of a fingerprint.

Also, the rolled fingerprint acquisition apparatus which can automatically detect whether to start or end registration and synthesis extracts the central location values of rolled fingerprint frames and selects target frames to be subject to registration and synthesis based on the central location values, thereby increasing efficiency of registration and synthesis.

Also, the rolled fingerprint acquisition apparatus which can automatically detect whether to start or end registration and synthesis sets control points in a region where foregrounds overlap each other, moves the control points to points matching the control points, connects the moved control points to set a second reference line, and synthesizes rolled fingerprint frames using the second reference line, thereby acquiring an accurate fingerprint.

Figure 2:
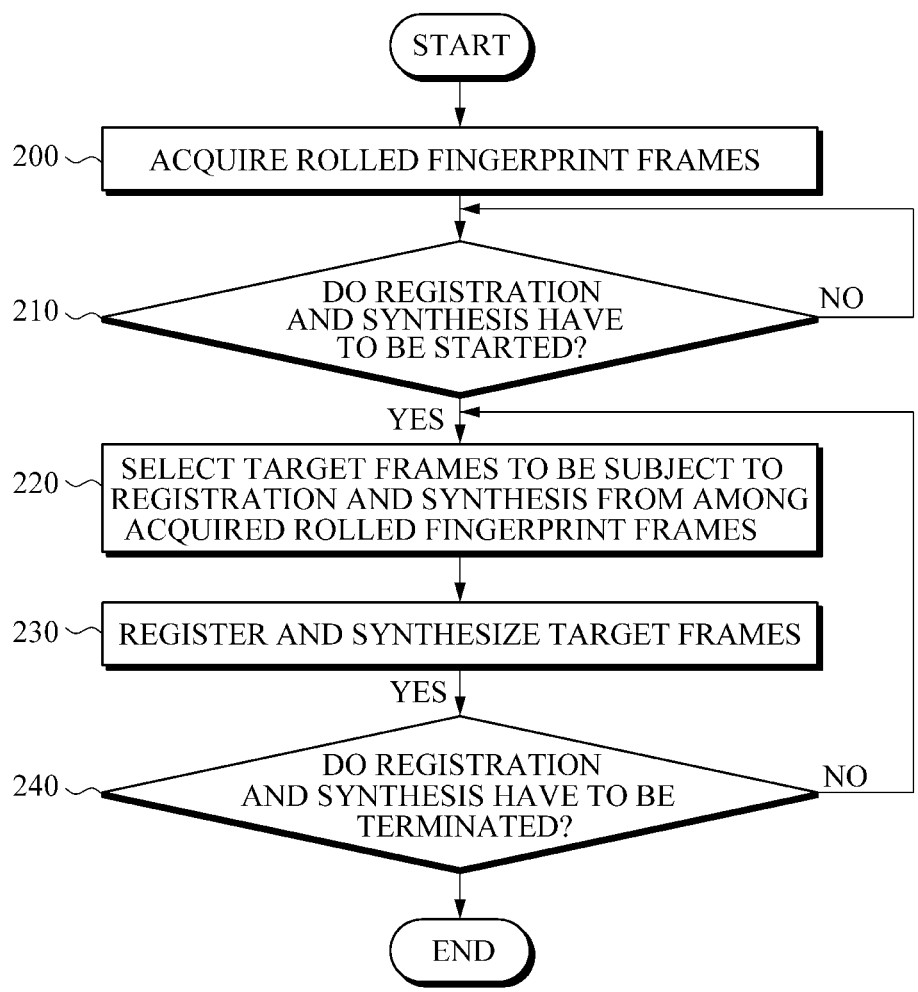
FIG. 2 is a flowchart illustrating an example of a rolled fingerprint acquisition method of automatically detecting the start and end of registration and synthesis.

FIG. 2 is a flowchart illustrating an example of a rolled fingerprint acquisition method of automatically detecting the start and end of registration and synthesis.

Referring to FIGS. 1 and 2, the rolled fingerprint acquisition apparatus 100 acquires rolled fingerprint frames through a sensor, etc. (operation 200). Then, the rolled fingerprint acquisition apparatus 100 determines whether to start or end registration and synthesis, based on at least one of reference fingerprint characteristic information and the amount of variation between fingerprint characteristic information, wherein the fingerprint characteristic information is information about fingerprints included in rolled fingerprint frames acquired by the rolled fingerprint frame acquisition unit 110 (operation 210). As described above with reference to FIG. 1, the start/end determiner 120 may determine whether to start or end registration and synthesis based on a combination of two or more conditions, such as the size values of fingerprints, the intensity values of pixels corresponding to fingerprints, the number of regions surrounded by closed curves included in fingerprints, and the central location values of fingerprints.

The rolled fingerprint acquisition apparatus 100 may perform registration and synthesis depending on the result of the determination on whether to start or end registration and synthesis. If it is determined that registration and synthesis should be started, the rolled fingerprint acquisition apparatus 100 may select target frames to be subject to registration and synthesis from among rolled fingerprint frames acquired after it is determined that registration and synthesis should be started (operation 220). Then, the rolled fingerprint acquisition apparatus 100 may register and synthesize the selected target frames to be subject to registration and synthesis (operation 230). Thereafter, the rolled fingerprint acquisition apparatus 100 determines whether to end the registration and synthesis based on at least one of reference fingerprint characteristic information and the amount of variation between fingerprint characteristic information, wherein the fingerprint characteristic information is information about the fingerprints included in the rolled fingerprint frames acquired by the rolled fingerprint frame acquisition unit 110 (operation 240). When it is determined that registration and synthesis should be ended, the rolled fingerprint acquisition apparatus 100 ends the registration and synthesis.

For example, the rolled fingerprint acquisition apparatus 100 acquires rolled fingerprint frames through a sensor, etc (operation 200). Then, the rolled fingerprint acquisition apparatus 100 determines whether to start registration and synthesis based on the sizes of fingerprints included in the acquired rolled fingerprint frames and the amount of variation in size of the fingerprints (operation 210). Next, the rolled fingerprint acquisition apparatus 100 may execute registration and synthesis according to the result of the determination on whether to start or end registration and synthesis. For example, when the size of a fingerprint included in a rolled fingerprint frame is larger than a reference fingerprint size and the amount of variation in size of the fingerprints is smaller than a reference size variation value, the rolled fingerprint acquisition apparatus 100 determines that registration and synthesis should be started. At this time, the rolled fingerprint acquisition apparatus 100 outputs a start notification signal for notifying of the start of registration and synthesis through the output unit 130. After recognizing the start notification signal, a user may roll his or her finger and the rolled fingerprint acquisition apparatus 100 acquires rolled fingerprint frames.

When it is determined that registration and synthesis should be started, the rolled fingerprint acquisition apparatus 100 may select target frames to be subject to registration and synthesis from among rolled fingerprint frames acquired after it is determined that registration and synthesis should be started (operation 220). Then, the rolled fingerprint acquisition apparatus 100 may register and synthesize the selected target frames to be subject to registration and synthesis (operation 230). Thereafter, the rolled fingerprint acquisition apparatus 100 determines whether to end registration and synthesis based on the sizes of fingerprints included in rolled fingerprint frames that are acquired by the rolled fingerprint frame acquisition unit 110 (operation 240). For example, when at least one of the sizes of fingerprints included in the rolled fingerprint frames is smaller than a reference fingerprint size, the rolled fingerprint acquisition apparatus 100 determines that registration and synthesis should be ended. Generally, the size of a fingerprint decreases just before a user terminates rolling of his or her finger. Accordingly, when the size of a fingerprint is smaller than the reference fingerprint size, the rolled fingerprint acquisition apparatus 100 determines that registration and synthesis should be ended. At this time, the rolled fingerprint acquisition apparatus 100 may output an end notification signal for notifying that registration and synthesis should be ended or a quality notification signal for informing of quality of an acquired fingerprint. Accordingly, the user may easily recognize the start and end of registration and synthesis. When it is determined that registration and synthesis should be ended, the rolled fingerprint acquisition apparatus 100 ends the registration and synthesis.

As another example, instead of selecting target frames to be subject to registration and synthesis from among rolled fingerprint frames acquired after it is determined that registration and synthesis should be started, the rolled fingerprint acquisition apparatus 100 may sequentially register and synthesize rolled fingerprint frames acquired after it is determined that registration and synthesis should be started.

Although not shown in the drawings, the rolled fingerprint acquisition apparatus 100 may output a start notification signal or an end notification signal through the output unit 130, according to the result of determination on whether to start or end registration and synthesis.

A rolled fingerprint acquisition method which can automatically recognize the start and end of registration and synthesis may register and synthesize only rolled fingerprint frames suitable for synthesis among received rolled fingerprint frames by determining the start and end of registration and synthesis.

Also, the rolled fingerprint acquisition method which can automatically detect the start and end of registration and synthesis informs a user of the start or end of registration and synthesis, so that the user can easily recognize the start or end of registration and synthesis of a fingerprint.

Also, the rolled fingerprint acquisition method which can automatically detect the start and end of registration and synthesis extracts the central location values of rolled fingerprint frames and selects target frames to be subject to registration and synthesis based on the central location values of the rolled fingerprint frames, thereby increasing efficiency of registration and synthesis.

Figure 3A:
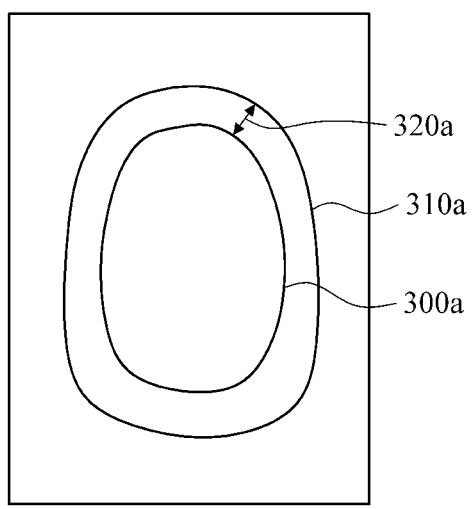
FIGS. 3A and 3B are views for explaining examples of fingerprint characteristic information.
Figure 3B:
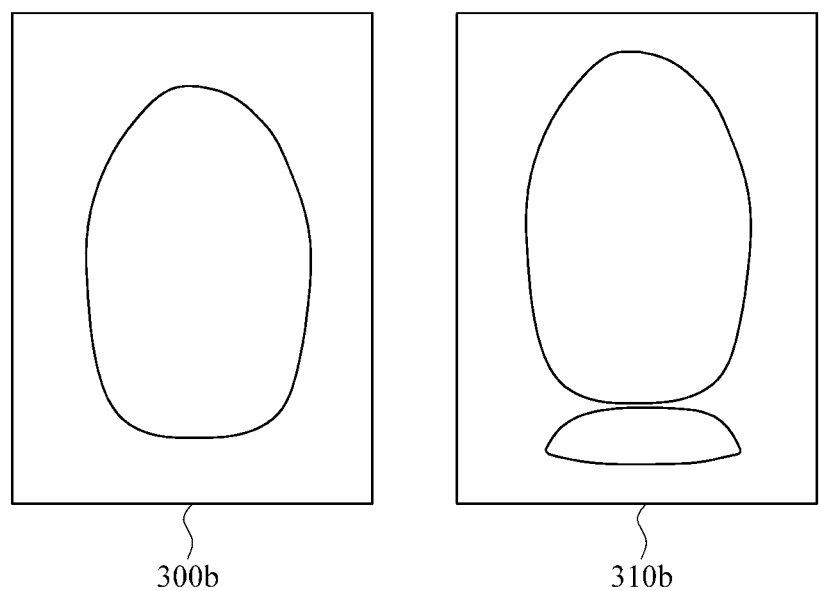

FIGS. 3A and 3B are views for explaining examples of fingerprint characteristic information.

FIG. 3A is a view for explaining the case where fingerprint characteristic information is the size values of fingerprints or the amount of variation in size of fingerprints.

Referring to FIGS. 1 and 3A, when fingerprint characteristic information is the amount of variation in size of fingerprints, the rolled fingerprint frame acquisition unit 110 acquires a first rolled fingerprint frame and a second rolled fingerprint frame. The start/end determiner 120 extracts a first size value of a fingerprint 300*a* included in the first rolled fingerprint frame and a second size value of a fingerprint 310*a* included in the second rolled fingerprint frame. Then, the start/end determiner 120 may determine whether the amount of variation 320*a* between the first and second size values is smaller than a reference size variation value. If the amount of variation 320*a* between the first and second size values is smaller than the reference size variation value, the start/end determiner 120 determines that registration and synthesis should be started. Meanwhile, if the amount of variation 320*a* between the first and second size values is larger than the reference size variation value, the start/end determiner 120 determines that no registration and synthesis need to be started.

As another example, after registration and synthesis are started, the rolled fingerprint frame acquisition unit 110 sequentially acquires a first rolled fingerprint frame and a second rolled fingerprint frame. Then, the start/end determiner 120 extracts a first size value of a fingerprint 310*a* included in the first rolled fingerprint frame and a second size value of a fingerprint 300*a* included in the second rolled fingerprint frame. Next, the start/end determiner 120 determines whether the amount of variation 320*a* between the first and second size values is smaller than a size variation threshold value. If the amount of variation 320*a* between the first and second size values is smaller than a size variation threshold value, the start/end determiner 120 determines that registration and synthesis should be ended. Meanwhile, if the amount of variation 320*a* is larger than the size variation threshold value, the start/end determiner 120 determines that registration and synthesis should continue to be performed.

As another example, when the fingerprint characteristic information is the size values of fingerprints, the rolled fingerprint frame acquisition unit 110 acquires a first rolled fingerprint frame. Then, the start/end determiner 120 extracts a first size value of a fingerprint 310*a* included in the first rolled fingerprint frame. Next, the start/end determiner 120 may determine whether the first size value is greater than a size value of a reference fingerprint 300*a*. In the current example, since the first size value is greater than the size value of the reference fingerprint 300*a*, the start/end determiner 120 determines that registration and synthesis should be started. Meanwhile, if the first size value is smaller than the size value of the reference fingerprint 300*a*, the start/end determiner 120 determines that no registration and synthesis need to be started.

As another example, when fingerprint characteristic information is the size values of fingerprints and registration and synthesis have already been started, the rolled fingerprint frame acquisition unit 110 acquires a first rolled fingerprint frame. The start/end determiner 120 extracts a first size value of a fingerprint 300*a* included in the first rolled fingerprint frame. Then, the start/end determiner 120 may determine whether the first size value is greater than a size value of a reference fingerprint 310*a*. If the first size value is smaller than the size value of the reference fingerprint 310*a*, the start/end determiner 120 may determine whether the first size value is greater than the size value of the reference fingerprint 310*a*. In the current example, since the first size value is smaller than the size value of the reference fingerprint 310*a*, the start/end determiner 120 determines that registration and synthesis should be ended.

Meanwhile, if the first size value is greater than the size value of the reference fingerprint 300*a*, the start/end determiner 120 determines that registration and synthesis should continue to be performed.

As another example, the start/end determiner 120 may detect the start or end of registration and synthesis using both the size values of fingerprints and the amount of variation between the size values of fingerprints.

FIG. 3B is a view for explaining the case where the fingerprint characteristic information is the number of regions surrounded by closed curves.

FIG. 3B shows the case where the number of regions surrounded by closed curves is one and the case where the number of regions surrounded by closed curves is two. For example, the start/end determiner 120 extracts the number of regions surrounded by closed curves included in rolled fingerprint frames. When the number of the extracted regions (that is, "the number of reference regions") is two or more, the start/end determiner 120 may determine that registration and synthesis should be started. Accordingly, when a first rolled fingerprint frame 300*b* is acquired, the start/end determiner 120 may determine that no registration and synthesis need to be started. Meanwhile, when a second rolled fingerprint frame 310*b* is acquired, the start/end determiner 120 may determine that registration and synthesis should be started.

As another example, when the first rolled fingerprint frame 300*b* is acquired after registration and synthesis are started, the start/end determiner 120 may determine that registration and synthesis should be ended. Meanwhile, if the second rolled fingerprint frame 310*b* is acquired, the start/end determiner 120 may determine that registration and synthesis should continue to be performed.

As another example, the start/end determiner 120 may determine whether to start or end registration/synthesis based on the size values of fingerprints and the numbers of regions surrounded by closed curves. A reference region number may be set to 1. The start/end determiner 120 may determine whether to start or end registration and synthesis based on whether the size value of a fingerprint is greater than a reference fingerprint size value and whether the number of regions surrounded by closed curves is greater than a reference region number.

Although not shown in the drawings, the start/end determiner 120 may determine whether to start or end registration and synthesis based on pixel intensity values or the amount of variation between pixel intensity values.

As such, the start/end determiner 120 may determine that registration and synthesis should be started or ended, based on a combination of two or more conditions, such as the size values of fingerprints, the intensity values of pixels corresponding to fingerprints, the number of regions surrounded by closed curves included in fingerprints, and the central location values of fingerprints.

Figure 4:
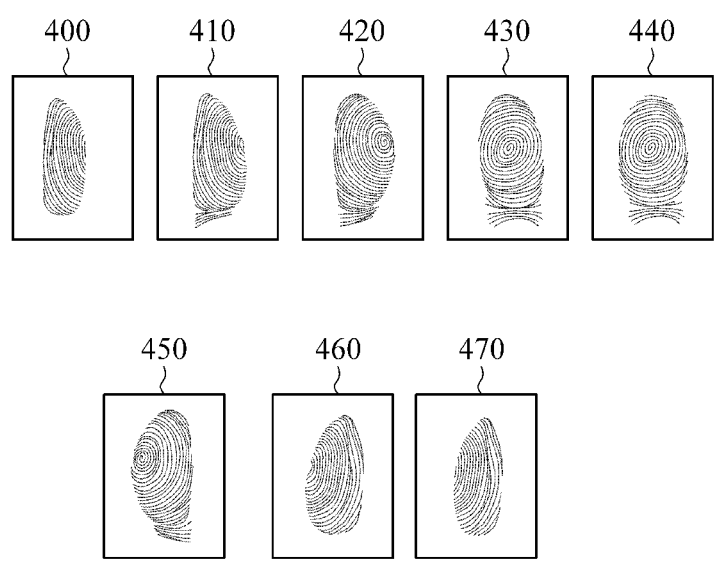
FIG. 4 is a view for explaining the rolled fingerprint acquisition method illustrated in FIG. 2.

FIG. 4 is a view for explaining the rolled fingerprint acquisition method illustrated in FIG. 2.

Referring to FIGS. 1 and 4, the rolled fingerprint acquisition apparatus 100 which automatically detects the start and end of registration and synthesis sequentially acquires a first rolled fingerprint frame 400, a second rolled fingerprint frame 410 and a third rolled fingerprint frame 420. Then, the rolled fingerprint acquisition apparatus 100 extracts fingerprint characteristic information of fingerprints included in the first, second and third rolled fingerprint frames 410, 420 and 430. Next, the rolled fingerprint acquisition apparatus 100 compares at least one of the fingerprint characteristic information and the amount of variation between the fingerprint characteristic information to reference fingerprint characteristic information to determine whether to start or end registration and synthesis. The rolled fingerprint acquisition apparatus 100 may start or end registration and synthesis according to the result of the determination.

For example, the case where the rolled fingerprint acquisition apparatus 100 determines whether to start or end registration and synthesis based on the amount of variation in size of fingerprints and the pixel intensity values of fingerprints will be described below. In this case, the fingerprint acquisition apparatus 100 calculates the amount of variation between the size values of fingerprints included in the first, second and third rolled fingerprint frames 400, 410 and 420 and the pixel intensity values of the fingerprints. When the amount of variation between the size values of the fingerprints included in the first, second and third rolled fingerprint frames 400, 410 and 420 is smaller than a reference size variation value and the pixel intensity value of a fingerprint included in at least one of the first, second and third rolled fingerprint frames 400, 410 and 420 is smaller than a reference fingerprint pixel intensity value (that is, the pixel intensity value corresponds to a dark color), the rolled fingerprint acquisition apparatus 100 determines that registration and synthesis should be started. Meanwhile, when the amount of variation between the size values of the fingerprints included in the first, second and third rolled fingerprint frames 400, 410 and 420 is greater than the reference size variation amount or the pixel intensity values of all fingerprints included in the first, second and third rolled fingerprint frames 400, 410 and 420 are greater than the reference rolled pixel intensity value (that is, the pixel intensity values correspond to a bright color), the rolled fingerprint acquisition apparatus 100 determines that no registration and synthesis need to be started.

After registration and synthesis are started, the rolled fingerprint acquisition apparatus 100 may compare the amount of variation between the size values of fingerprints included in fourth, fifth and sixth rolled fingerprint frames 430, 440 and 450 and the pixel intensity values of the fingerprints with predetermined criteria, respectively, and determine whether to end registration and synthesis according to the result of the comparison. The rolled fingerprint acquisition apparatus 100 continues to perform the comparison until determining that registration and synthesis should be ended. When the amount of variation between the size values of the fingerprints included in the sixth rolled fingerprint frame 450, a seventh rolled fingerprint frame 460 and an eighth rolled fingerprint frame 470 is smaller than the reference size variation value and the pixel intensity values of all fingerprints included in the sixth, seventh and eighth rolled fingerprint frames 450, 460 and 470 are greater than the reference fingerprint pixel intensity value (that is, the pixel intensity values correspond to a bright color), the rolled fingerprint acquisition apparatus 100 determines that registration and synthesis should be ended. Finally, the rolled fingerprint acquisition apparatus 100 registers and synthesizes the fourth rolled fingerprint frame 430, the fifth rolled fingerprint frame 440, the sixth rolled fingerprint frame 450 and the seventh rolled fingerprint frame 460.

In the current example, the rolled fingerprint acquisition apparatus 100 determines whether to start or end registration and synthesis every three rolled fingerprint frames. However, the current example may be also applied to determine whether to start or end registration and synthesis every two or more rolled fingerprint frames.

Also, the current example corresponds to the case of determining whether to start or end registration and synthesis based on the amount of variation between the size values of fingerprints and the pixel intensity values of fingerprints, however, it is also possible to determine whether to start or end registration and synthesis based on a combination of two or more conditions, such as the size values of fingerprints, the intensity values of pixels corresponding to fingerprints, the number of regions surrounded by closed curves included in fingerprints, and the central location values of fingerprints.

Figure 5:
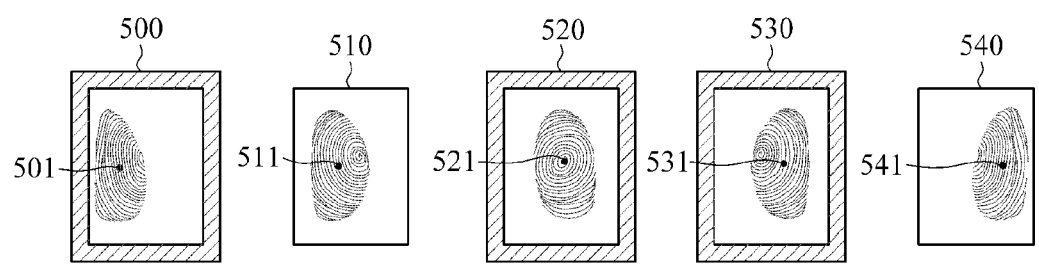
FIG. 5 is a view for explaining a process of selecting frames to be registered and synthesized in the rolled fingerprint acquisition method illustrated in FIG. 2.

FIG. 5 is a view for explaining a process of selecting frames to be registered and synthesized in the rolled fingerprint acquisition method illustrated in FIG. 2.

Referring to FIGS. 1 and 5, after registration and synthesis are started, the rolled fingerprint acquisition apparatus 100 acquires a first rolled fingerprint frame 500, a second rolled fingerprint frame 510, a third rolled fingerprint frame 520, a fourth rolled fingerprint frame 530 and a fifth rolled fingerprint frame 540. Then, the rolled fingerprint acquisition apparatus 100 extracts the central locations 501, 511, 521, 531 and 541 of fingerprints included in the first through fifth rolled fingerprint frames 500, 510, 520, 530 and 540. Next, the rolled fingerprint acquisition apparatus 100 may select target frames to be subject to registration and synthesis based on the extracted central locations 501, 511, 521, 531 and 541 of the fingerprints included in the first through fifth rolled fingerprint frames 500, 510, 520, 530 and 540.

For example, the rolled fingerprint acquisition apparatus 100 may select the first rolled fingerprint frame 500 as a first target frame to be subject to registration and synthesis. Then, the rolled fingerprint acquisition apparatus 100 selects the third rolled fingerprint frame 520 whose central location 521 is farther than a reference distance from the central location 501 of the first target frame 500, as a second target frame to be subject to registration and synthesis. Next, the rolled fingerprint acquisition apparatus 100 may select the fourth rolled fingerprint frame 530 whose central location 531 is farther than the reference distance from the central location 521 of the second target frame 520, as a third target frame to be subject to registration and synthesis. The rolled fingerprint acquisition apparatus 100 performs the above-described process until determining that registration and synthesis should be ended. Finally, the rolled fingerprint acquisition apparatus 100 registers and synthesizes the first rolled fingerprint frame 500, the third rolled fingerprint frame 520 and the fourth rolled fingerprint frame 530.

The current example corresponds to the case where 5 rolled fingerprint frames are acquired, however, the number of acquired rolled fingerprint frames is not limited.

Figure 6:
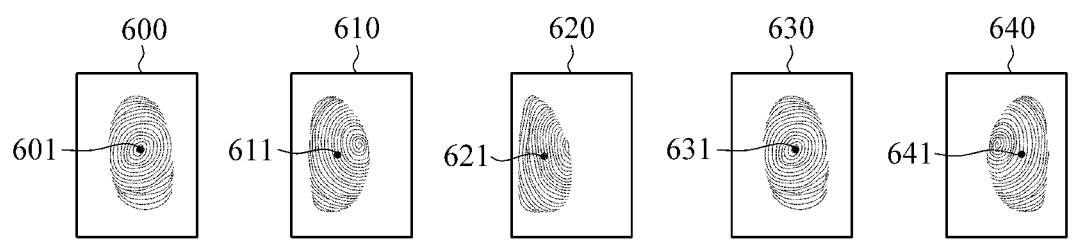
FIG. 6 is a view for explaining a process of determining whether to start registration and synthesis in the rolled fingerprint acquisition method illustrated in FIG. 2.

FIG. 6 is a view for explaining a process of determining whether to start registration and synthesis in the rolled fingerprint acquisition method illustrated in FIG. 2.

Referring to FIGS. 1 and 6, the rolled fingerprint acquisition apparatus 100 acquires a first rolled fingerprint frame 600, a second rolled fingerprint frame 610, a third rolled fingerprint frame 620, a fourth rolled fingerprint frame 630 and a fifth rolled fingerprint frame 640. The rolled fingerprint acquisition apparatus 100 calculates a first central location 601 of a fingerprint included in the first rolled fingerprint frame 600 and a second central location 611 of a fingerprint included in the second rolled fingerprint frame 610. Then, the rolled fingerprint acquisition apparatus 100 extracts a movement direction of the central locations based on the first and second central locations 601 and 611. The rolled fingerprint acquisition apparatus 100 may recognize that the movement direction of the central locations is still "left".

Then, the rolled fingerprint acquisition apparatus 100 calculates a second central location 611 of a fingerprint included in the second rolled fingerprint frame 610 and a third central location 621 of a fingerprint included in the third rolled fingerprint frame 620. Then, the rolled fingerprint acquisition apparatus 100 extracts a movement direction of the central locations based on the second and third central locations 611 and 621. The rolled fingerprint acquisition apparatus 100 may recognize that the movement direction of the central location is still "left".

Then, the rolled fingerprint acquisition apparatus 100 calculates a third central location 621 of a fingerprint included in the third rolled fingerprint frame 620 and a fourth central location 631 of a fingerprint included in the fourth rolled fingerprint frame 630. Then, the rolled fingerprint acquisition apparatus 100 extracts a movement direction of the central locations based on the third and fourth central locations 621 and 631. The rolled fingerprint acquisition apparatus 100 may recognize that the movement direction of the central location has changed to "right." At this time, the rolled fingerprint acquisition apparatus 100 may determine that registration and synthesis should be started since the movement direction of the central locations has been inverted.

Accordingly, the rolled fingerprint acquisition apparatus may determine whether to start registration and synthesis even when a user rolls his or her finger in various directions.

Figure 7:
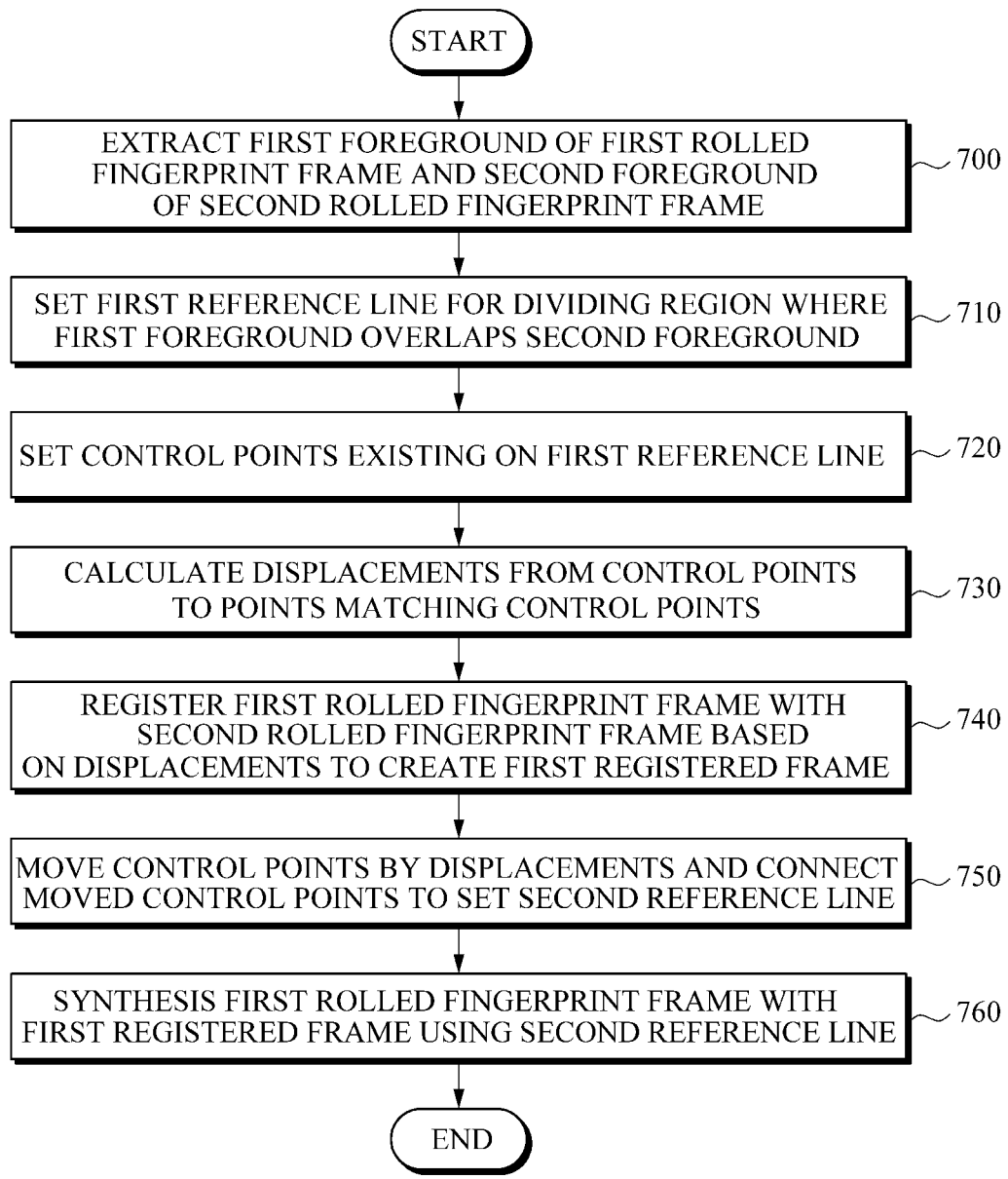
FIG. 7 is a flowchart for explaining a process for registration and synthesis in the rolled fingerprint acquisition method illustrated in FIG. 2 in detail.

FIG. 7 is a flowchart for explaining a process for registration and synthesis in the rolled fingerprint acquisition method illustrated in FIG. 2 in detail.

Referring to FIGS. 1 and 7, after determining that registration and synthesis should be started, the rolled fingerprint acquisition apparatus 100 acquires a first rolled fingerprint frame and a second rolled fingerprint frame. Then, the rolled fingerprint acquisition apparatus 100 extracts a first foreground including a fingerprint of the first rolled fingerprint frame and a second foreground including a fingerprint of the second rolled fingerprint frame (operation 700). Then, the rolled fingerprint acquisition apparatus 100 sets a first reference line for dividing a region where the first foreground overlaps the second foreground (operation 710). The rolled fingerprint acquisition apparatus 100 sets at least two points that are included in the second foreground and are on the first reference line as control points (operation 720).

Successively, the rolled fingerprint acquisition apparatus 100 calculates displacements from the control points to points that are on the first rolled fingerprint frame and match the control points (operation 730). Then, the rolled fingerprint acquisition apparatus 100 registers the second rolled fingerprint frame with the first rolled fingerprint frame based on the displacements to create a first registered frame (operation 740). Next, the rolled fingerprint acquisition apparatus 100 moves the control points by the displacements and then connects the moved control points to set a second reference line (operation 750). Finally, the rolled fingerprint acquisition apparatus 100 synthesizes the first registered frame and the first rolled fingerprint frame using the second reference line (operation 760).

The rolled fingerprint acquisition apparatus 100 assigns a weight to a pixel intensity value of a portion including the central location of the first rolled fingerprint frame with respect to the second reference line, and assigns a weight to a pixel intensity value of a portion including the central location of the first registered frame with respect to the second reference line.

The rolled fingerprint acquisition method sets control points in a region where foregrounds overlap, moves the control points to points matching the control points, and then connects the moved control points to set a second reference line and synthesizes rolled fingerprint frames using the second reference line, thereby acquiring an accurate fingerprint.

FIGS. 8A through 8E are views for explaining a method of setting a first reference line in the process for registration and synthesis described above with reference to FIG. 7.

Figure 8A:
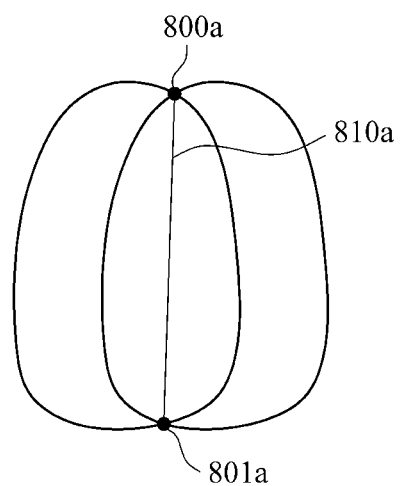
FIGS. 8A through 8E are views for explaining a method of setting a first reference line in the process for registration and synthesis.

Referring to FIGS. 1 and 8A, the rolled fingerprint acquisition apparatus 100 may set a line 810*a* obtained by connecting points 800*a* and 801*a* at which the outline of the first foreground crosses the outline of the second foreground as a first reference line.

Figure 8B:
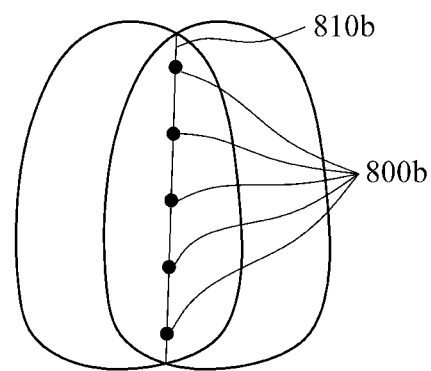

Referring to FIGS. 1 and 8B, the rolled fingerprint acquisition apparatus 100 may perform morphological erosion on the first and second foregrounds to extract points 800*b* at which the outline of the first foreground meets the outline of the second foreground, and set a line 810*b* obtained by connecting the extracted points 800*b* to each other as a first reference line.

Figure 8C:
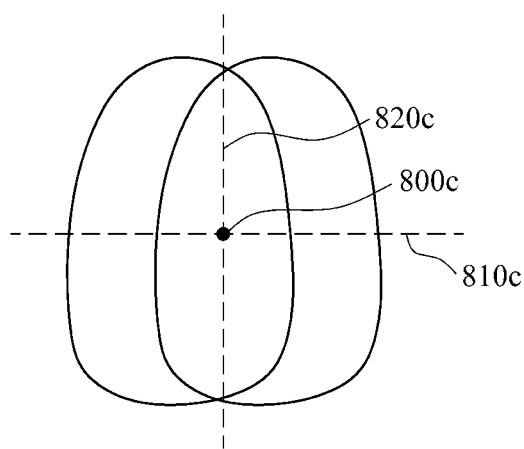

Referring to FIGS. 1 and 8C, the rolled fingerprint acquisition apparatus 100 may calculate a central location value 800*c* of a region where the first foreground overlaps the second foreground, and set a straight line 820*c* perpendicular to a horizontal line 810*c* crossing the central location value 800*c* as a first reference line.

Figure 8D:
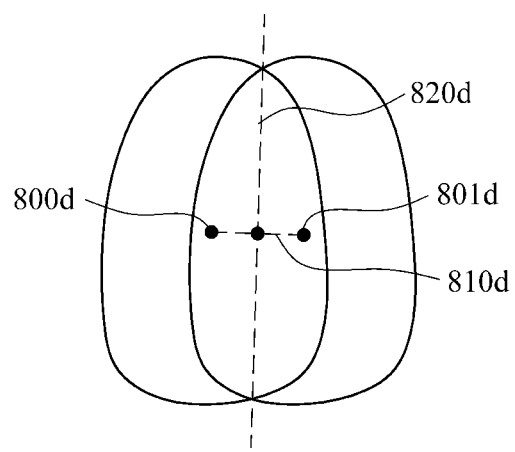

Referring to FIGS. 1 and 8D, the rolled fingerprint acquisition apparatus 100 may set a straight line 820*d* perpendicular to a line 810*d* connecting a central location 800*d* of the first foreground to a central location 801*d* of the second foreground as a first reference line.

Figure 8E:
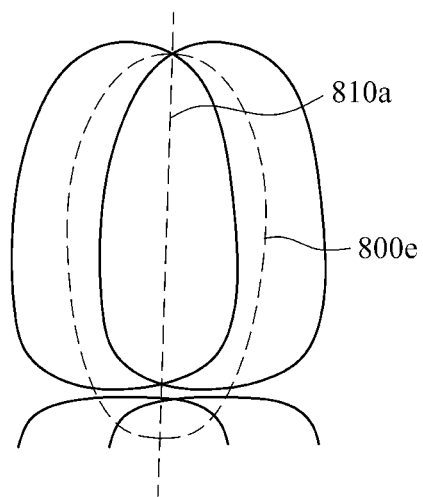

Referring to FIGS. 1 and 8E, the rolled fingerprint acquisition apparatus 100 may extract an ellipse 800*e* from a region where the first foreground overlaps the second foreground, using an ellipse fitting algorithm, and set a line 810*e* corresponding to the major axis of the ellipse 800*e* as a first reference line.

Figure 9:
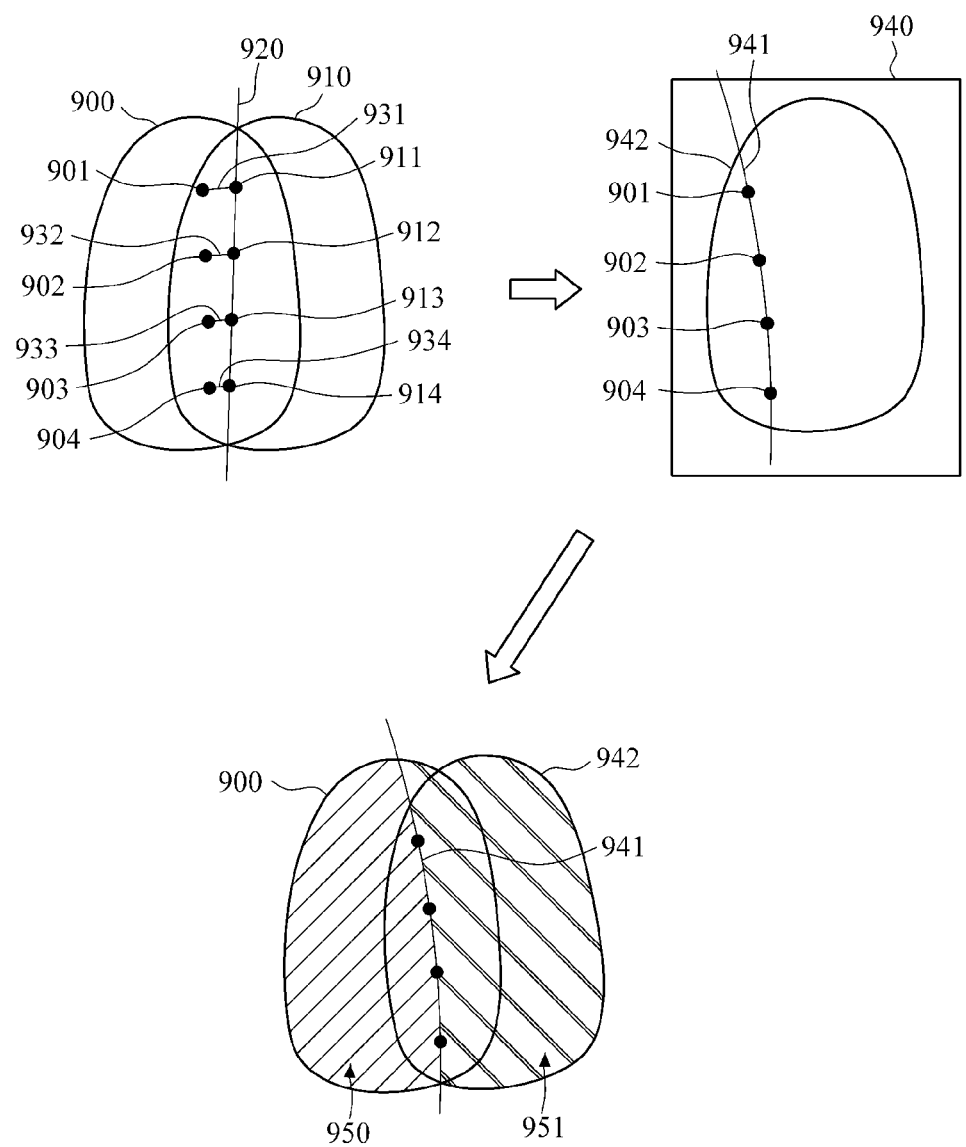
FIG. 9 is a view for explaining the process for registration and synthesis in the rolled fingerprint acquisition method illustrated in FIG. 2 in detail.

FIG. 9 is a view for explaining the process for registration and synthesis in the rolled fingerprint acquisition method illustrated in FIG. 2 in detail.

Referring to FIGS. 1 and 9, the registration/synthesis unit 150 extracts a first foreground 900 including a fingerprint of a first rolled fingerprint frame and a second foreground 910 including a fingerprint of a second rolled fingerprint frame. Then, the registration/synthesis unit 150 correlates the first foreground 900 with the second foreground 910. For example, the rolled fingerprint acquisition apparatus 100 may correlate the first foreground 900 with the second foreground 910 by overlapping the first rolled fingerprint frame with the second rolled fingerprint frame. As another example, the registration/synthesis unit 150 may correlate the first foreground 900 with the second foreground 910 by matching feature points, such as the end points, diverging points, central points, etc., of fingerprints included in the first and second foregrounds 900 and 910. The registration/synthesis unit 150 sets a first reference line 920 for dividing a region where the first foreground overlaps the second foreground. Then, the registration/synthesis unit 150 sets at least two of points that are included in the second foreground 910 and are on the first reference line as control points 911, 912, 913 and 914. Next, the registration/synthesis unit 150 calculates displacements from the control points 911, 912, 913 and 914 to points 901, 902, 903 and 904 that match the control points 911, 912, 913 and 914 and are on the first rolled fingerprint frame. The registration/synthesis unit 150 registers the second rolled fingerprint frame with the first rolled fingerprint frame based on the displacements to create a first registered frame 940. For example, the registration/synthesis unit 150 may register the second rolled fingerprint frame with the first rolled fingerprint frame by moving all pixels of the second rolled fingerprint frame according to the calculated displacements. At this time, the registration/synthesis unit 150 may determine distance for moving the pixels of the second rolled fingerprint frame by interpolating displacements of pixels adjacent to the pixels. The first registered frame 940 includes a foreground 942 corresponding to a fingerprint.

Then, the registration/synthesis unit 150 moves the control points 911, 912, 913 and 914 by the displacements and then connects the moved control points 901, 902, 903 and 904 to set a second reference line 941. The registration/synthesis unit 150 synthesizes the first registered frame 940 with the first rolled fingerprint frame using the second reference line 941. For example, the registration/synthesis unit 150 may assign a weight to a pixel intensity value of a foreground including a fingerprint of the first rolled fingerprint frame in a portion 950 that include a central location of the first rolled fingerprint frame with respect to the second reference line, and assign a weight to a pixel intensity value of a foreground including a fingerprint of the first registered frame of a portion 951 that include a central location of the first registered frame 940 with respect to the second reference line. The registration/synthesis unit 150 may synthesize the first rolled frame and the first registered frame based on the assigned weight.

the registration/synthesis unit 150 assigns a weight to a pixel intensity value of a portion including a central location of a fingerprint included in the first rolled fingerprint frame with respect to the second reference line, and assigns a weight to a pixel intensity value of a portion including a central location of a fingerprint included in the first registered frame 940 with respect to the second reference line.

The above-described examples may be selectively combined to allow various modifications.

The above-described methods may be implemented as codes readable by a processor in a medium in which programs are recorded. The medium may be ROM, RAM, CD-ROM, a magnetic tape, a floppy disk or optical data storage, or may be implemented in the form of carrier waves (for example, transmission through the Internet).

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A rolled fingerprint acquisition method which automatically detects a start and end of registration and synthesis, comprising:
    extracting fingerprint characteristic information of fingerprints included in rolled fingerprint frames that are sequentially acquired;
    comparing at least one of the fingerprint characteristic information and the amount of variation between the fingerprint characteristic information to reference fingerprint characteristic information to determine whether to start or end registration and synthesis; and
    registering and synthesizing the rolled fingerprint frames according to the result of the determination,
    wherein the registering and synthesizing of the rolled fingerprint frames comprises:
    setting a first reference line for dividing a region where a first foreground corresponding to a fingerprint of a first rolled fingerprint frame that is a rolled fingerprint frame acquired after it is determined that registration and synthesis should be started overlaps a foreground corresponding to a fingerprint of a second rolled fingerprint frame;
    setting at least two of points that are included in the second foreground and are on the reference line as control points;
    calculating displacements from the control points to points that are on the first rolled fingerprint frame and match the control points;
    registering the second rolled fingerprint frame with the first led fingerprint frame based on the displacements to create a first registered frame;
    moving the control points by the displacements and connecting the moved control points to set a second reference line; and
    synthesizing the first registered frame with the first rolled fingerprint frame using the second reference line.

2. The rolled fingerprint acquisition method of claim 1, further comprising selecting target frames to be subject to registration and synthesis by comparing central location values of fingerprints included in rolled fingerprint frames acquired after registration and synthesis have been started.

3. The rolled fingerprint acquisition method of claim 2, wherein the selecting of the target frames to be subject to the registration and synthesis comprises:
    extracting central location values of fingerprints included in rolled fingerprint frames acquired after registration and synthesis have been started;
    selecting a first target frame to be subject to registration and synthesis from among the acquired rolled fingerprint frames;
    selecting a rolled fingerprint frame whose central location is farther than a threshold value from a central location of the first target frame to be subject to registration and synthesis as a second target frame to be subject to registration and synthesis; and
    selecting a rolled fingerprint frame whose central location is farther than the threshold value from the central location of the second target frame to be subject to registration and synthesis as a third target frame to be subject to registration and synthesis.

4. The rolled fingerprint acquisition method of claim 1, wherein the synthesizing of the first registered frame with the first rolled fingerprint frame comprises assigning a weight to a pixel intensity value of a foreground including a fingerprint of the first rolled fingerprint frame in a portion that include a central location of the first rolled fingerprint frame with respect to the second reference line, and assigning a weight to a pixel intensity value of a foreground including a fingerprint of the first registered frame of a portion that include a central location of the first registered frame with respect to the second reference line.

5. The rolled fingerprint acquisition method of claim 1, wherein the synthesizing of the first registered frame with the first rolled fingerprint frame comprises assigning a higher weight to the pixel intensity value of the first rolled fingerprint frame than to the pixel intensity value of the first registered frame, in a portion including a central location of the first rolled fingerprint frame with respect to the second reference line, and assigning a higher weight to the pixel intensity value of the first registered frame than to the pixel intensity value of the first rolled fingerprint frame, in a portion including a central location of the first registered frame with respect to the second reference line.

6. The rolled fingerprint acquisition method of claim 1, wherein the determining of whether to start or end registration and synthesis comprises comparing, when the amount of variation between the fingerprint characteristic information is the amount of variation between the size values of the fingerprints included in the rolled fingerprint frames, the amount of variation between the size values of the fingerprints with a reference size variation value and determining whether to start or end registration and synthesis according to the result of the comparison.

7. The rolled fingerprint acquisition method of claim 1, wherein the determining of whether to start or end registration and synthesis comprises comparing, when the fingerprint characteristic information is the size values of the fingerprints included in the rolled fingerprint frames, the size values of the fingerprints with a reference fingerprint size value and determining whether to start or end registration and synthesis according to the result of the determination.

8. The rolled fingerprint acquisition method of claim 1, wherein the determining of whether to start or end registration and synthesis comprises comparing, when the amount of variation between the fingerprint characteristic information is pixel intensity values of the fingerprints included in the rolled fingerprint frames, the amount of variation between the pixel intensity values with a reference pixel intensity variation value and determining whether to start or end registration and synthesis according to the result of the determination.

9. The rolled fingerprint acquisition method of claim 1, wherein the determining of whether to start or end registration and synthesis comprises comparing, when the fingerprint characteristic information is pixel intensity values of the fingerprints included in the rolled fingerprint frames, the pixel intensity values with a reference pixel intensity value and determining whether to start or end registration and synthesis according to the result of the determination.

10. The rolled fingerprint acquisition method of claim 1, wherein the determining of whether to start or end registration and synthesis comprises comparing, when the fingerprint characteristic information is the number of regions surrounded by closed curves included in a fingerprint, the number of regions with a reference region number and determining whether to start or end registration and synthesis according to the result of the determination.

11. The rolled fingerprint acquisition method of claim 1, wherein the determining of whether to start or end registration and synthesis comprises:
when the fingerprint characteristic information is central location values of the fingerprints included in the rolled fingerprint frames, extracting central location values of fingerprints included in the rolled fingerprint frames;
extracting a movement direction of the central locations based on the central location values of the rolled fingerprint frames; and
when the movement direction of the central locations is inverted, determining that registration and synthesis should be started.

12. The rolled fingerprint acquisition method of claim 1, wherein the fingerprint characteristic information is at least one among sizes of the fingerprints, pixel intensity values corresponding to the fingerprints, the number of regions surrounded by closed curves included in the fingerprints, and central location values of the fingerprints.

13. The rolled fingerprint acquisition method of claim 1, further comprising outputting a notification signal for notifying of a fingerprint acquisition process through an output unit, according to the result of the determination on whether to start or end registration and synthesis.

14. A rolled fingerprint acquisition method comprising:
extracting sizes of fingerprints included in rolled fingerprint frames that are sequentially acquired;
starting registration and synthesis when the amount of variation in size of the fingerprints is smaller than a reference size variation value and the sizes of the fingerprints are smaller than a reference fingerprint size; and
ending registration and synthesis when at least one of sizes of fingerprints included in rolled fingerprint frames acquired after registration and synthesis have been started is smaller than the reference fingerprint size
wherein the method is performed using a computer and/or a processor, and
wherein the registering and synthesizing of the rolled fingerprint frames comprises:
setting a first reference line for dividing a region where a first foreground corresponding to a fingerprint of a first rolled fingerprint frame that is a rolled fingerprint frame acquired after it is determined that registration and synthesis should be started overlaps a foreground corresponding to a fingerprint of a second rolled fingerprint frame;
setting at least two of points that are included in the second foreground and are on the first reference line as control points;
calculating displacements from the control points to points that are on the first rolled fingerprint frame and match the control points;
registering the second rolled fingerprint frame with the first rolled fingerprint frame based on the displacements to create a first registered frame;
moving the control points by the displacements and connecting the moved control points to set a second reference line; and
synthesizing the first registered frame with the first rolled fingerprint frame using the second reference line.

15. A rolled fingerprint acquisition apparatus comprising:
a start/end determiner to compare at least one of the fingerprint characteristic information and the amount of variation between the fingerprint characteristic information to reference fingerprint characteristic information and determine whether to start or end registration and synthesis, wherein the fingerprint characteristic information is information about fingerprints included in rolled fingerprint frames that are sequentially acquired; and
a registration/synthesis unit to register and synthesize the rolled fingerprint frames according to the result of the determination,
wherein the registration/synthesis unit sets a first reference line for dividing a region where a first foreground corresponding to a fingerprint of a first roiled fingerprint frame acquired after it is determined that registration and synthesis should be started overlaps a second foreground corresponding to a fingerprint of a second rolled fingerprint frame, sets at least two of points that are included in the second foreground and are on the first reference line as control points, calculates displacements from the control points to points that are on the first rolled fingerprint frame and match the control points, registers the second rolled fingerprint frame with the first rolled fingerprint frame based on the displacements to create a first registered frame, moves the control points by the displacements, then connects the moved control points to set a second reference line, and synthesizes the first registered frame with the first rolled fingerprint frame using the second reference line.

16. The rolled fingerprint acquisition apparatus of claim 15, further comprising a selector to select a target frame to be subject to registration and synthesis by comparing central location values of fingerprints included in rolled fingerprint frames acquired after registration and synthesis have been started.

17. The rolled fingerprint acquisition apparatus of claim 16, wherein the selector extracts central location values of fingerprints included in rolled fingerprint frames acquired after registration and synthesis have been started, selects a first target frame to be subject to registration and synthesis from among the acquired rolled fingerprint frames, selects a rolled fingerprint frame whose central location is farther than a threshold value from the central location of the first target frame as a second target frame to be subject to registration and synthesis, and selects a rolled fingerprint frame whose central location is farther than the threshold value from the central location of the second target frame as a third target frame to be subject to registration and synthesis.

18. The rolled fingerprint acquisition apparatus claim 15, wherein the registration/synthesis unit synthesizes the first registered frame with the first rolled fingerprint frame using the second reference line.

19. The rolled fingerprint acquisition apparatus of claim 15, further comprising an output unit to output a notification signal for notifying of a fingerprint acquisition process.

* * * * *